(12) United States Patent
Hofmann et al.

(10) Patent No.: US 9,939,018 B2
(45) Date of Patent: Apr. 10, 2018

(54) ROLLING-ELEMENT BEARING

(71) Applicant: AKTIEBOLAGET SKF, Göteborg (SE)

(72) Inventors: Sabine Hofmann, Wuerzburg (DE); Baozhu Liang, Dittelbrunn-Hambach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/305,001

(22) PCT Filed: Apr. 24, 2015

(86) PCT No.: PCT/EP2015/058946
§ 371 (c)(1),
(2) Date: Oct. 18, 2016

(87) PCT Pub. No.: WO2015/162262
PCT Pub. Date: Oct. 29, 2015

(65) Prior Publication Data
US 2017/0198752 A1   Jul. 13, 2017

(30) Foreign Application Priority Data
Apr. 25, 2014  (DE) .................. 10 2014 207 836

(51) Int. Cl.
*F16C 33/46* (2006.01)
*F16C 33/51* (2006.01)
*F16C 33/50* (2006.01)

(52) U.S. Cl.
CPC ........ *F16C 33/4605* (2013.01); *F16C 33/467* (2013.01); *F16C 33/4664* (2013.01); *F16C 33/502* (2013.01); *F16C 33/51* (2013.01)

(58) Field of Classification Search
CPC ...... F16C 19/26; F16C 19/305; F16C 19/361; F16C 33/502; F16C 33/4611; F16C 33/4664; F16C 33/467
USPC ........ 384/526, 548, 560, 573, 578–581, 551
See application file for complete search history.

(56) References Cited

U.S. PATENT DOCUMENTS

| 1,966,266 A | 7/1934 | Skelly |
| 3,543,894 A | 12/1970 | Giese |
| 3,586,406 A * | 6/1971 | Barr ...................... F16C 19/466 384/580 |

(Continued)

FOREIGN PATENT DOCUMENTS

| DE | 1228110 B | 11/1966 | |
| DE | 102006022951 A1 * | 11/2007 | .............. F16C 19/34 |

(Continued)

*Primary Examiner* — Marcus Charles
(74) *Attorney, Agent, or Firm* — Bryan Peckjian; SKF USA Inc. Patent Dept.

(57) ABSTRACT

A rolling bearing includes an inner ring, an outer ring, a plurality of rolling elements disposed between the inner ring and the outer ring, and a plurality of cage segments separating circumferentially adjacent ones of the plurality of rolling elements. Each of the cage segments has an axial bridge portion and side plates at axially opposite ends of the bridge portion, each of the side plates having a convex end and a concave end circumferentially spaced from the convex end. The convex end of a first one of the side plates contacts the concave end of a second one of the side plates.

16 Claims, 4 Drawing Sheets

(56) References Cited

U.S. PATENT DOCUMENTS

| | | | | |
|---|---|---|---|---|
| 4,436,349 A * | 3/1984 | Hallerback | ............ | F16C 23/086 384/572 |
| 5,082,375 A * | 1/1992 | Hillmann | ................ | F16C 29/04 384/526 |
| 5,116,146 A * | 5/1992 | Stenert | .................... | F16C 19/30 384/572 |
| 5,647,674 A * | 7/1997 | Ohashi | ................ | F16C 33/4629 384/575 |
| 5,660,485 A * | 8/1997 | Podhajecki | ............ | F16C 19/26 384/572 |
| 6,883,968 B2 * | 4/2005 | Fugel | .................... | F16C 33/546 384/577 |
| 7,963,702 B2 * | 6/2011 | Ozu | ........................ | F16C 19/26 384/520 |
| 8,303,191 B2 * | 11/2012 | Albrecht | ................ | F16C 19/30 384/572 |
| 8,523,451 B2 * | 9/2013 | Ozu | ........................ | F16C 19/26 384/551 |
| 9,039,289 B2 * | 5/2015 | Fox | .......................... | F16C 43/04 384/573 |
| 9,097,283 B2 * | 8/2015 | Werner | ................ | F16C 33/4611 |
| 9,217,470 B2 * | 12/2015 | Beck | ...................... | F16C 43/04 |
| 2013/0118851 A1 | 5/2013 | Nelson | | |

FOREIGN PATENT DOCUMENTS

| | | | | |
|---|---|---|---|---|
| DE | 102011006031 A1 * | 9/2012 | ............. | B21D 53/12 |
| DE | 102011089078 A1 * | 6/2013 | ............. | F16C 43/04 |
| DE | 102012223316 B3 * | 5/2014 | .......... | F16C 33/3706 |
| DE | 102013224541 A1 * | 6/2015 | ............... | F16C 33/46 |
| DE | 102014203148 A1 * | 8/2015 | ............... | F16C 33/50 |
| DE | 102015216399 A1 * | 3/2017 | ............... | F16C 33/50 |
| GB | 1296976 A | 11/1972 | | |
| JP | 2013032842 A * | 2/2013 | .......... | F16C 33/4611 |
| KR | 20120055875 A * | 6/2012 | .......... | F16C 33/4605 |
| WO | WO-2012076583 A2 * | 6/2012 | ............. | F16C 19/364 |
| WO | WO-2012110601 A2 * | 8/2012 | .......... | F16C 33/4611 |

* cited by examiner

ROLLING-ELEMENT BEARING

CROSS-REFERENCE

This application is the U.S. National Stage of International Application No. PCT/EP2015/058946 filed on Apr. 24, 2015, which claims priority to German patent application no. 10 2014 207 836.9 filed on Apr. 25, 2014.

TECHNOLOGICAL FIELD

The invention relates to a rolling-element bearing with at least one inner ring and at least one outer ring, wherein a number of rolling elements are disposed between the bearing rings, wherein the rolling elements are held by a cage, wherein the cage is comprised of a number of cage segments, wherein each cage segment contacts two rolling elements at at least two contact surfaces preferably adapted to the shape of the rolling element, wherein at least one attachment element is disposed on each cage segment, and wherein the cage segments are at least intermittently connectable via a coupling element, for which purpose the coupling element is brought into engagement with the attachment elements.

BACKGROUND

A rolling-element bearing of the above-described type is known from DE 10 2011 004 374 A1. The cage is not embodied here as a one-piece component, rather it is comprised of a number of cage segments (also referred to as cage spacers) that are connected to one another via a wire-shaped connecting element that circulates in the circumferential direction. WO 2012/076583 A2 (a family member of US 2015/078699) discloses a similar solution wherein the cage is comprised of a number of cage segments.

The design of the cage in the form of segments has the advantage that there is a particularly good suitability for large (tapered) roller bearings, and the loads arising here can be supported particularly well. Furthermore, the individual cage segments can be mounted well; at the same time a low cage weight can be achieved. The configuration of the cage segments makes possible a secure receiving of the rolling element and a reliable guiding of the cage segment on the rolling element. Here the cage segments do not come into contact in intended use; they are not connected to one another.

With the previously known designs of the cage using cage segments it is disadvantageous that under certain use conditions a free rolling movement of the rolling elements is prevented when namely the cage segments press the rolling elements together strongly under specific operating conditions of the bearing. Initially it is always provided that there is a defined cage clearance in the rolling-element bearing in the circumferential direction that makes possible the rolling of the rolling elements. However, with certain operating conditions it can happen that all rolling elements and cage spacers push together and thus the free rolling of the rolling elements becomes more difficult or is not possible.

SUMMARY

The object of the invention is to further develop a bearing of the above-described type such that this disadvantage is eliminated, i.e., it is to be ensured that a clamping of the rolling elements is prevented in every case.

The achievement of this object by the invention is characterized in that each cage segment includes in at least one axial end region a side plate partially covering the end side of the rolling element, wherein two side plates successive in the circumferential direction can contact two adjacent cage segments at contact surfaces configured complementary to each other.

Here one of the contact surfaces configured complementary to each other preferably has a convex shape, while the other of the contact surfaces has a concave shape. Here the convex shape preferably has a stronger curvature than the concave shape. It is preferably provided here that each side plate of the cage segment has a contact surface with convex shape in the one end region lying in the circumferential direction, and a contact surface with concave shape in the other end region lying in the circumferential direction.

The contact surfaces preferably lie in the region of the axis of the rolling element.

The coupling element is usually a tensile-force-transmitting but largely flexible component. Here it is preferably a cable.

The at least one attachment element can be configured as an eyelet, through which the coupling element can be threaded, wherein the at least one attachment element is preferably formed-on one-piece on the cage segment.

An alternative provides that the attachment elements are configured respectively as two interacting hook-shaped elements that engage the coupling element at opposing circumferential sections.

The cage segment is preferably configured as a one-piece component.

The cage segment can finally include at least one slip surface for slipping on a shoulder or a flange of a bearing ring, whereby a shoulder-guiding is possible.

The two interacting end regions of the adjacent side plates of the cage segments can be embodied straight or with a certain geometry (concave and convex mating); in the last case the geometry can be embodied in complementary negative and corresponding positive shape at the ends of the side plates.

Using these extended side plates (side elements), which support one another, the cage clearance between the cage segments and the rolling elements can be adjusted and determined in a targeted manner such that the rolling element has sufficient free space for rolling, since in the case of the sliding together of all rolling elements, first the contact surfaces of the side plates contact before the rolling elements come into contact with their bridge.

In addition, the cage segments can be supported on the inner-ring shoulder, i.e., in this case they are shoulder-guided. Due to the provided connecting element (cable) the side plates (side elements) and the bridges form an inseparable and free space for the rolling elements. The mating of the negative and positive end shape of the side elements allows the required free and relative (tipping) movement of two adjacent and in-contact side plates in the bearing application.

Due to the extending of the side plates on the cage segments the side plates (with their positive and negative complementary geometry embodiment) come into contact instead of the rolling elements coming into contact with the bridge. This means that the free rolling of the rolling elements can be ensured.

The two axially end-side-disposed side plates here are preferably connected to each other with a bridge in the shape of a support element (connecting beam) wherein at least one guide element is disposed on the support element, which guide element includes a contact surface adapted to the shape of the rolling element.

The rolling-element bearing is in particular a roller bearing, preferably a tapered roller bearing, a cylindrical roller bearing, or a spherical roller bearing.

As stated above, each cage segment contacts two rolling elements at at least two contact surfaces preferably adapted to the shape of the rolling element. This adapting usually consists in that the contact surfaces are configured congruent to the shape of the rolling element. However, a simply hook-shaped design of the contact surfaces would also generally be possible, for example, in order to hold the rolling elements in position.

A further development provides that at least one spacer element is disposed against or on the coupling element. With this spacer element the relative movability between the coupling element and at least one attachment element can be limited in the circumferential direction. Additively or alternatively the spacer element also serves to hold the space between two adjacent cage segments constant. Accordingly, spacer elements are thus provided that are strung on the cable and disposed between two cage segments in order to hold the cage segments at a defined spacing in the circumferential direction. The movement possibility of the individual cage segments relative to one another and in the circumferential direction can thus be defined or adjusted.

The cage segments represent spacers between two rolling elements. The cage segments (cage spacers) thus serve simply as separating elements between the rolling elements. The cage segments are installed in the bearing alternating with the rolling elements; accordingly the number of cage segments corresponds to that of the rolling elements.

Due to the provided coupling element (cable) a captive connection arises between rolling elements and cage on the inner ring.

Due to the use of individual separate cage segments, the flexibility of the roller-cage connection is advantageously increased. With the proposed solution the degree of flexibility of the cage system is thus further increased.

Furthermore it is possible to reduce costs since injection-molding tools can be used that require a smaller installation space than in previously known solutions.

The inventive design offers the possibility to disassemble the bearing for installation, i.e., in the case of tapered roller bearings to separate the inner ring plus roller set from the outer ring, without the bearing components falling apart. The cage segments are thus self-retaining.

Here the cable can only remain installed until the final assembly of the bearing is carried out; it can then be removed since it is not required for the operation of the bearing. However, it can equally also be provided that the cable remains permanently installed.

The cable is preferred as coupling element, however, other solutions are also conceivable, for example, a screw connection that is effectively disposed between two adjacent cage segments.

Thus the cage comprised of segments together with rollers can be captively connected with the bearing inner ring in an advantageous manner by the applying of the coupling element (cable) to the attachment elements, and installed in the application separately from the outer ring. The installation of the bearing is correspondingly simpler.

BRIEF DESCRIPTION OF THE DRAWINGS

Exemplary embodiments of the invention are depicted in the drawings.

DETAILED DESCRIPTION

In the figures the inventive concept is illustrated for the use in a tapered roller bearing.

Figure 1:
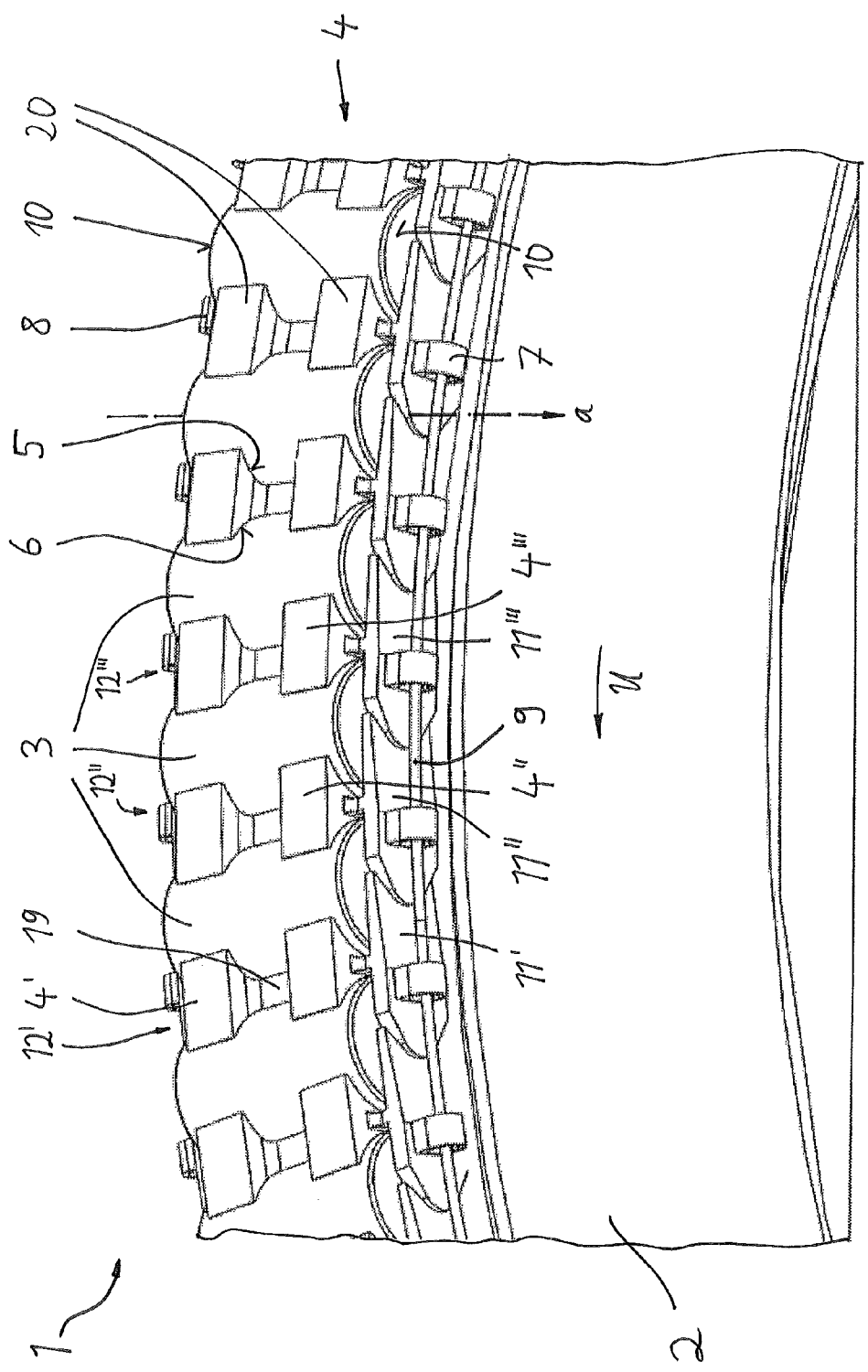
FIG. 1 shows, in perspective view, a section of a tapered roller bearing, depicted without bearing outer ring.

In FIG. 1 a rolling-element bearing 1 in the form of a tapered roller bearing can be seen wherein the inner ring 2 and the cage 4 can be recognized; rolling elements 3 (tapered rollers) are held with the cage 4. Each tapered roller 3 has an axis a. The cage 4 is comprised of a number of cage segments 4', 4", 4''' disposed sequentially in the circumferential direction U. The configuration of the cage segments 4', 4", 4''' is best shown in FIG. 2.

Each cage segment 4', 4", 4''' has a bridge 19, which in the exemplary embodiment includes two guide elements 20. Each guide element has a contact surface 5 and a contact surface 6, which form respective congruent slip surfaces for the rolling elements 3 and thus guide them. A side plate 11', 11", 11''', or 12', 12", 12''' is disposed in each of the two axial end regions of the bridges 19. The side plates form slip surfaces for the end sides 10 of the rolling elements 3.

Attachment elements 7 and 8 are formed-on on the side plates 11', 11", 11''' and/or 12', 12", 12''' in the axially outer-lying region, and indeed as eyelets, through which the coupling element 9 in the form of a cable can be guided (see FIG. 1), in order to hold together the entirety of the cage segments 4', 4", 4'''. Due to the flanges 17 and 18 of the inner ring 2 (for this purpose see FIG. 3 and FIG. 4) a captive connection thus arises of inner ring, rolling elements, and cage.

Figure 2:
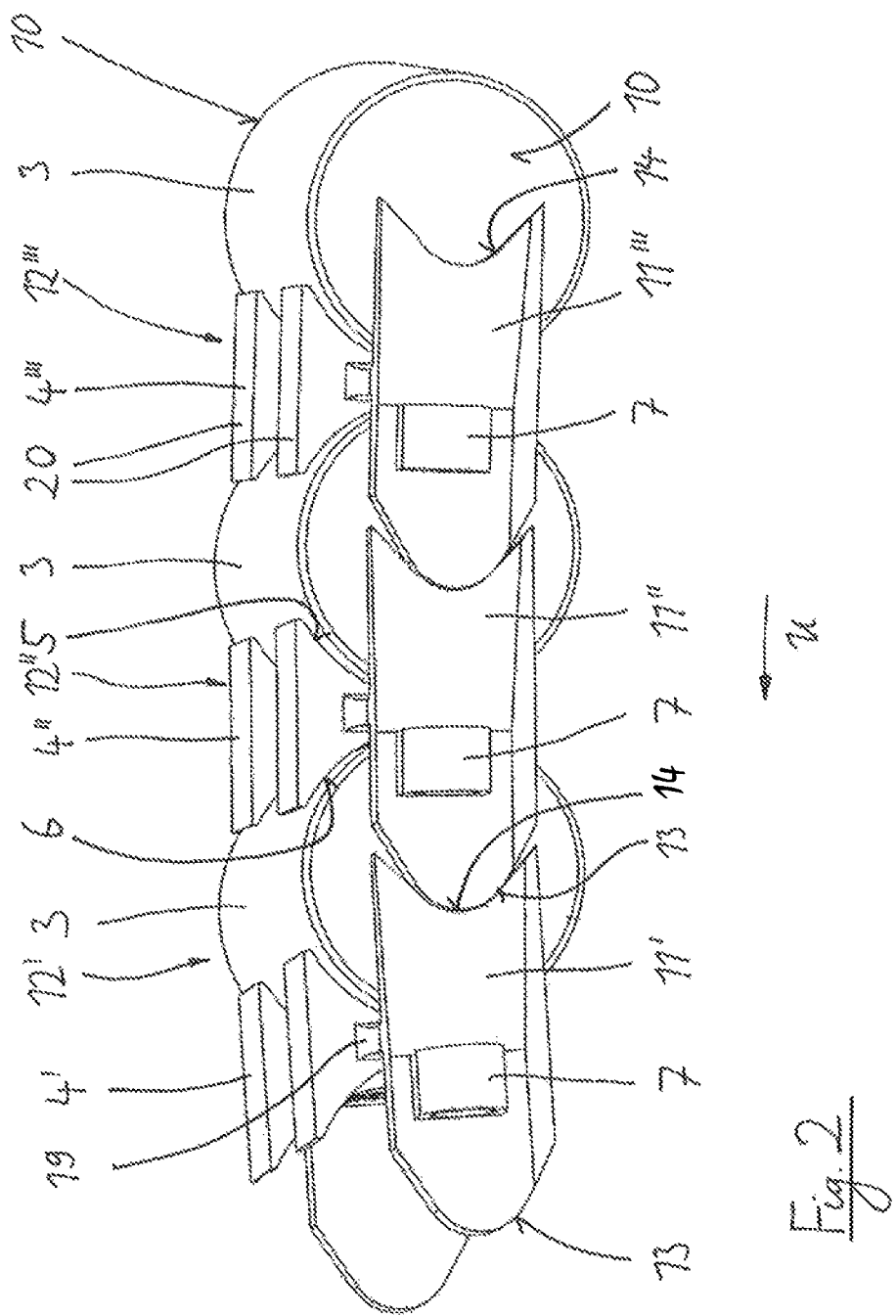
FIG. 2 shows, in perspective view, an enlarged section of the tapered roller bearing according to FIG. 1, wherein only one cage section, comprised of three cage segments, is depicted with associated rolling elements.

It is essential that each cage segment 4', 4", 4''' respectively includes in its two axial end regions a side plate 11', 11", 11''', or 12', 12", 12''' partially covering the end side 10 of the rolling element 3, wherein—for this purpose see especially FIG. 2—two side plates 11', 11", 11''', or 12', 12", 12''', successive in the circumferential direction U, can contact two adjacent cage segments 4', 4", 4''' at contact surfaces 13 and 14 configured complementary to each other.

Here the one contact surface 13 is embodied convex, the other contact surface 14 concave in a largely congruent manner, so that seen in the circumferential direction U a left end in FIG. 2 can enter in a corresponding right end. The convex design here is somewhat more strongly curved than the concave design, which can be seen in FIG. 2 at the contact situation of two side plates 11.

It is thereby no longer possible that, due to too great a tension in cable 9 or due to corresponding load states in the rolling-element bearing, rolling elements 3 and cage segments 4', 4", 4''' can be pushed together too strongly in circumferential direction U, so that a clamping of the rolling elements 3 is prevented.

Figure 3:
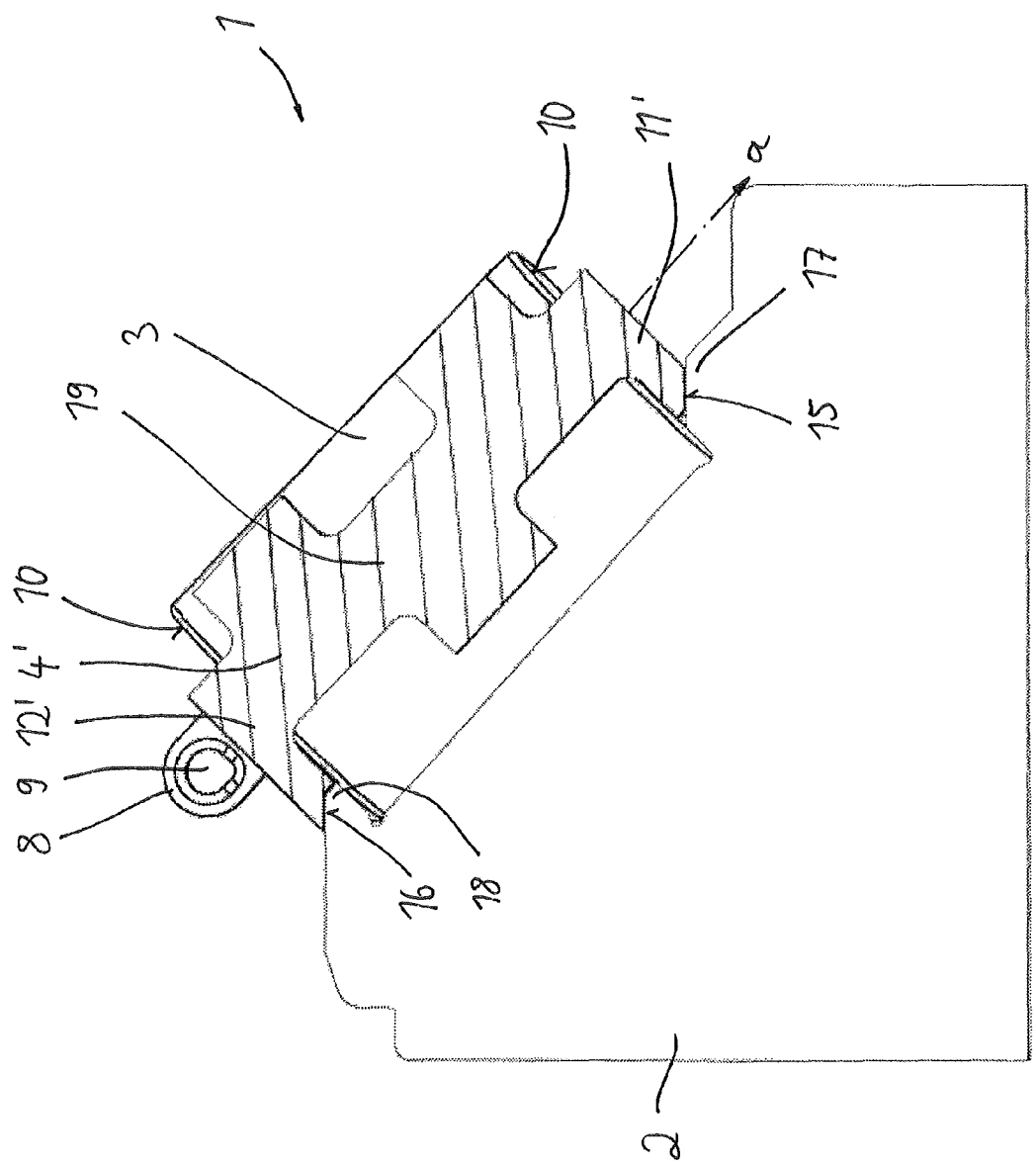
FIG. 3 shows a radial section through the tapered roller bearing without bearing outer ring.
Figure 4:
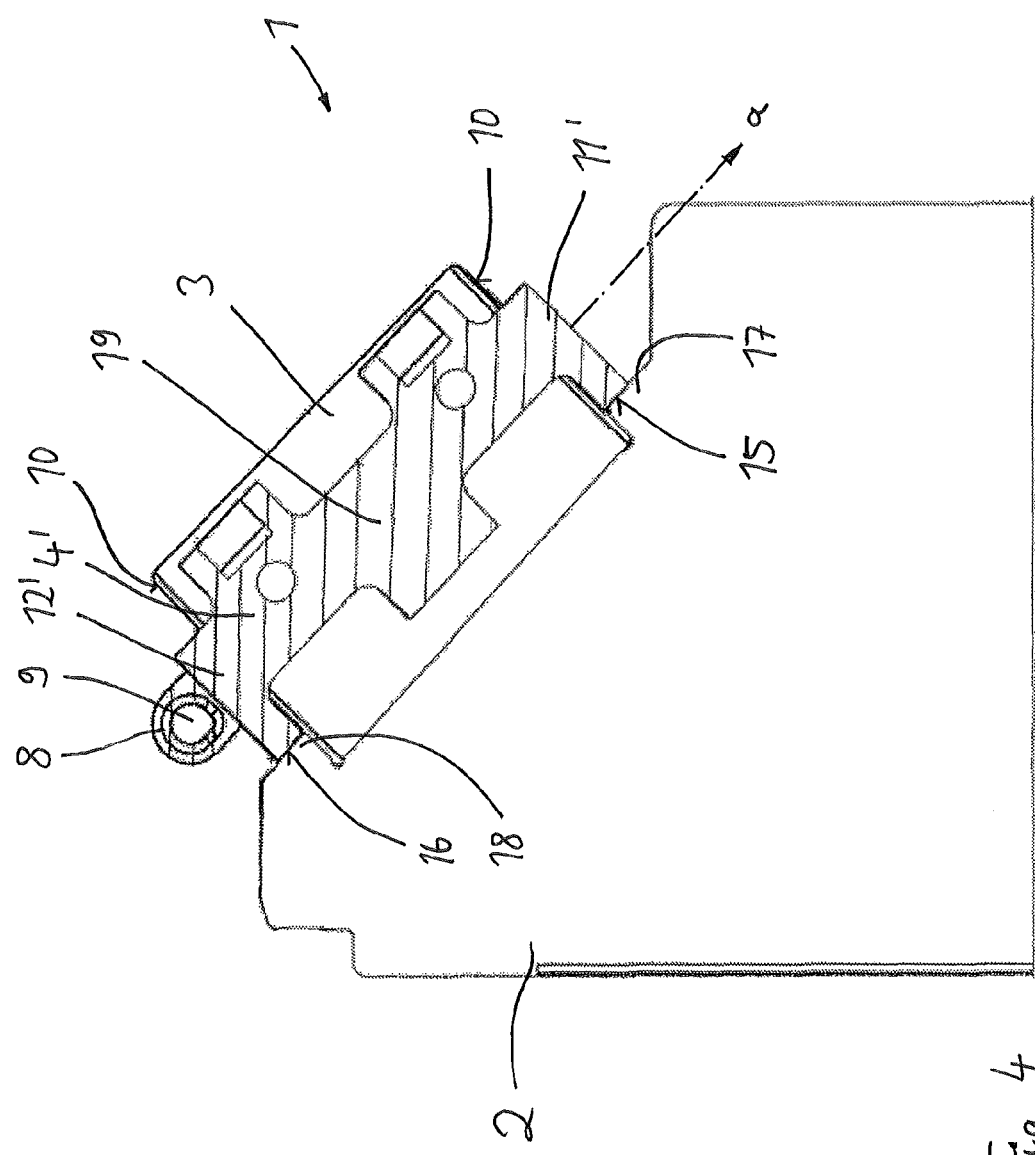
FIG. 4 shows an embodiment slightly modified with respect to FIG. 3.

The preferred shoulder guiding provided of the cage 4 is depicted in FIGS. 3 and 4. According to this each cage segment 4', 4", 4''' has a slip surface 15 or 16 provided in the radially inner-lying end region, which is embodied to slip on a corresponding outer surface of the flange 17 or 18.

REFERENCE NUMBER LIST

1 Rolling-element bearing
2 Inner ring
3 Rolling element
4 Cage
4' Cage segment
4" Cage segment
4''' Cage segment
5 Contact surface
6 Contact surface
7 Attachment element
8 Attachment element
9 Coupling element (cable)
10 End side of the rolling element
11' Side plate
11" Side plate
11''' Side plate
12' Side plate
12" Side plate
12''' Side plate
13 Contact surface
14 Contact surface
15 Slip surface
16 Slip surface
17 Shoulder/flange
18 Shoulder/flange
19 Bridge
20 Guide element
U Circumferential direction
A Axis of the rolling element

The invention claimed is:

1. A rolling bearing comprising:
at least one inner ring and at least one outer ring,
wherein between the at least one inner ring and the at least one outer ring a number of rolling elements are arranged,
wherein the rolling elements are held by a cage,
wherein the cage is made of a number cage-segments including a first cage segment and a second cage segment,
wherein each cage segment comprises two rolling element contact surfaces,
wherein each cage segment includes at least one attachment element,
wherein each cage segment includes in at least one axial end region a side plate partially covering an end side of one of the rolling elements, the side plate having a convex end edge and a concave end edge spaced from the convex end edge in a circumferential direction, and
wherein the concave end edge of the side plate of the first cage segment non-interlockingly abuts the convex end edge of the side plate of the second cage segment.

2. The rolling-element bearing according to claim 1, wherein the convex end edge has a greater curvature than a curvature of the concave end edge.

3. The rolling-element bearing according to claim 1, wherein the contact surfaces lie in a region of the axis of the rolling element.

4. The rolling-element bearing according to claim 1, including a coupling element extending through the attachment elements, wherein the coupling element is a flexible, tensile-force-transmitting component.

5. The rolling-element bearing according to claim 4 wherein the coupling element is a cable.

6. The rolling-element bearing according to claim 5, wherein the at least one attachment element is configured as an eyelet, through which the coupling element is threaded, wherein the at least one attachment element is formed-on one-piece on the cage segment.

7. The rolling-element bearing according to claim 1, wherein the cage segment is configured as a one-part component.

8. The rolling-element bearing according to claim 1, wherein the cage segment includes at least one slip surface for slipping on a shoulder or a flange of a bearing ring.

9. The rolling-element bearing according to claim 1, including a coupling element configured to at least temporarily connect the cage segments via the attachment elements.

10. The rolling-element bearing according to claim 1, wherein no portion of the side plate of the first cage segment lies axially adjacent the second cage segment.

11. The rolling-element bearing according to claim 1, wherein no portion of the first cage segment lies axially adjacent the second cage segment.

12. A rolling bearing comprising:
an inner ring;
an outer ring;
a plurality of rolling elements disposed between the inner ring and the outer ring; and
a plurality of cage segments separating circumferentially adjacent ones of the plurality of rolling elements, each of the cage segments comprising an axial bridge portion and side plates at axially opposite ends of the bridge portion, the side plates overlying axial ends of the rolling elements, each of the side plates having a convex end and a concave end circumferentially spaced from the convex end,
wherein the concave end of the side plate of the first cage segment non-interlockingly abuts the convex end of the side plate of the second cage segment.

13. The rolling bearing according to claim 12, wherein a curvature of the convex portion is greater than a curvature of the concave portion.

14. The rolling bearing according to claim 13, wherein each of the side plates includes an eyelet and including a cable extending through the eyelets to connect the cage segments together.

15. The rolling-element bearing according to claim 12, wherein no portion of the first one of the side plates lies axially adjacent the second cage segment.

16. The rolling-element bearing according to claim 12, wherein no portion of the first one of the side plates lies axially adjacent the second cage segment.

* * * * *